United States Patent
Liang et al.

(10) Patent No.: US 11,164,538 B2
(45) Date of Patent: Nov. 2, 2021

(54) STORAGE MEDIUM, EXPANSION BASE AND OPERATION METHOD THEREOF COMBINED WITH PORTABLE ELECTRONIC DEVICE

(71) Applicants: Che-Wei Liang, Taipei (TW); Xiu-Yu Lin, Taipei (TW); Yi-Han Liao, Taipei (TW); Sheng-Chieh Tang, Taipei (TW); Chieh-Yu Chan, Taipei (TW); Chiao-Tsu Chiang, Taipei (TW); Wen-Yi Chiu, Taipei (TW); Wei-Chih Hsu, Taipei (TW); Li-Fang Chen, Taipei (TW); Yi-Jing Lin, Taipei (TW)

(72) Inventors: Che-Wei Liang, Taipei (TW); Xiu-Yu Lin, Taipei (TW); Yi-Han Liao, Taipei (TW); Sheng-Chieh Tang, Taipei (TW); Chieh-Yu Chan, Taipei (TW); Chiao-Tsu Chiang, Taipei (TW); Wen-Yi Chiu, Taipei (TW); Wei-Chih Hsu, Taipei (TW); Li-Fang Chen, Taipei (TW); Yi-Jing Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/409,889

(22) Filed: May 13, 2019

(65) Prior Publication Data
US 2019/0371261 A1    Dec. 5, 2019

Related U.S. Application Data

(60) Provisional application No. 62/681,081, filed on Jun. 5, 2018, provisional application No. 62/670,857, filed on May 13, 2018.

(51) Int. Cl.
*G09G 5/00*    (2006.01)
*G06F 3/0488*    (2013.01)
(Continued)

(52) U.S. Cl.
CPC .......... *G09G 5/003* (2013.01); *G06F 1/1632* (2013.01); *G06F 3/04886* (2013.01);
(Continued)

(58) Field of Classification Search
CPC .... G06F 1/1605; G06F 1/1607; G06F 1/1613; G06F 1/1615; G06F 1/1626;
(Continued)

(56) References Cited

U.S. PATENT DOCUMENTS

| | | | |
|---|---|---|---|
| 9,646,574 B2 | 5/2017 | Hoellwarth | |
| 2007/0216655 A1* | 9/2007 | Chen | G06F 1/1607 345/173 |

(Continued)

FOREIGN PATENT DOCUMENTS

| | | | | |
|---|---|---|---|---|
| JP | 2015005279 A | * | 1/2015 | G06F 3/03547 |

OTHER PUBLICATIONS

English translation of JP-2015005279-A (Year: 2015).*
"Office Action of Taiwan Counterpart Application", dated Jul. 20, 2020, p. 1-p. 9.

*Primary Examiner* — Nathan Danielsen
(74) *Attorney, Agent, or Firm* — JCIPRNET

(57) ABSTRACT

The disclosure provides a storage medium, an expansion base and an operation method thereof combined with a portable electronic device. The portable electronic device is pre-installed with an application program and includes a touch screen. The expansion base is paired with the portable electronic device and accommodates the portable electronic device. When the portable electronic device is accommodated inside the expansion base, a touch window on the surface of the expansion base exposes at least a portion of the touch screen, and the portable electronic device executes the application program to automatically adjust a size or a (Continued)

display position of a display image of the touch screen to correspond to the touch window.

20 Claims, 13 Drawing Sheets

(51) Int. Cl.
*G06F 1/16* (2006.01)
*G06F 3/14* (2006.01)
(52) U.S. Cl.
CPC .. *G06F 3/1446* (2013.01); *G06F 2203/04803* (2013.01); *G09G 2320/06* (2013.01); *G09G 2370/16* (2013.01)
(58) Field of Classification Search
CPC .... G06F 1/1628; G06F 1/1632; G06F 1/1637; G06F 1/1643; G06F 1/1654; G06F 1/166; G06F 1/1667; G06F 1/1673; G06F 1/1679; G06F 1/1681; G06F 3/0481; G06F 3/04817; G06F 3/0482; G06F 3/0484; G06F 3/04847; G06F 3/0487; G06F 3/04886; G06F 3/1446; G06F 2200/1634; G06F 2203/04803; G06F 2203/04809; G09G 5/003; G09G 5/005; G09G 2320/06; G09G 2320/08; G09G 2320/10; G09G 2340/04; G09G 2340/0442; G09G 2340/0464; G09G 2340/14; G09G 2340/145; G09G 2370/16; G09G 2370/22; G09G 2380/06; G09G 2380/16; H04M 1/0254; H04M 1/0256; H04M 1/0266; H04M 1/0279–0283; H04M 1/0295; H04M 1/06; H04M 1/21; H04M 1/22; H04M 1/72519–72533; H04M 1/72563; H04M 1/72569; H04M 1/72575; H04M 1/7258; H04M 1/72583

See application file for complete search history.

(56) References Cited

U.S. PATENT DOCUMENTS

| | | | |
|---|---|---|---|
| 2011/0244925 A1* | 10/2011 | Kavounas | H04M 19/045 455/567 |
| 2014/0168126 A1* | 6/2014 | Yu | G06F 3/04886 345/173 |
| 2014/0294173 A1* | 10/2014 | Bonde | H04M 1/6066 379/428.02 |
| 2014/0333831 A1* | 11/2014 | Oh | H04M 1/67 348/376 |
| 2016/0313821 A1* | 10/2016 | Bui | G06F 3/04186 |
| 2016/0323007 A1* | 11/2016 | Halpern | H04B 1/3888 |

* cited by examiner

STORAGE MEDIUM, EXPANSION BASE AND OPERATION METHOD THEREOF COMBINED WITH PORTABLE ELECTRONIC DEVICE

CROSS REFERENCE TO RELATED APPLICATION

This application claims the priority benefit of U.S. provisional application Ser. No. 62/670,857, filed on May 13, 2018 and U.S. provisional application Ser. No. 62/681,081, filed on Jun. 5, 2018. The entirety of each of the above-mentioned patent application is hereby incorporated by reference herein and made a part of specification.

BACKGROUND

Technical Field

The disclosure relates to an electronic device, and more particularly to a storage medium, an expansion base, and an operation method thereof combined with a portable electronic device.

Description of Related Art

With the advancement of technology, portable electronic devices are commonly used in everyday life. Almost everyone has a smart phone. However, today's electronic devices have been upgrading fast. Often, the next generation of products is launched to the market not long after users bought their portable electronic devices, which makes users replace their old portable electronic devices with the latest modules. Therefore, in order to avoid waste, how to reuse these portable electronic devices that are still usable becomes an issue. In addition, how to expand the use of portable electronic devices and combine them with other electronic devices to maximize utility is another issue waiting to be solved.

SUMMARY

The disclosure provides a storage medium, an expansion base, and an operation method thereof combined with a portable electronic device. The expansion base and the portable electronic device of the disclosure may be combined into an electronic expansion system to expand an application range of the portable electronic device or strengthen a function of the portable electronic device and increase the usable value of the portable electronic device.

An operation method of the disclosure configured to combine the portable electronic device and the expansion base includes: pairing the portable electronic device with the expansion base, wherein the portable electronic device is pre-installed with an application program and includes a touch screen; accommodating the portable electronic device inside the expansion base, wherein a surface of the expansion base has a touch window to expose at least a portion of the touch screen; and executing the application program to automatically adjust a size or a display position of a display image of the touch screen to correspond to the touch window.

A storage medium of the disclosure is configured to store the application program. The application program is loaded by the portable electronic device to perform: pairing the portable electronic device with the external expansion base; accommodating the portable electronic device inside the external expansion base, wherein the surface of the external expansion base has the touch window to expose at least a portion of the touch screen of the portable electronic device; and automatically adjusting the size or the display position of the display image of the touch screen according to the pairing information of the external expansion base to correspond to the touch window.

An expansion base of the disclosure adapted for accommodating an external portable electronic device includes an accommodating chamber and a second communication module. The accommodating chamber is configured to accommodate the external portable electronic device and has the touch window, wherein the touch window exposes at least a portion of the touch screen of the external portable electronic device when the external portable electronic device is placed in the accommodating chamber. The second communication module is configured to pair with a first communication module of the external portable electronic device and to transmit an identifier of the expansion base to the external portable electronic device to allow the external portable electronic device to adjust a size or a display position of a display image of the touch screen according to the identifier to correspond to the touch window.

Based on the above, the storage medium, the expansion base and the operation method thereof combined with the portable electronic device of the disclosure may integrate the portable electronic device and the expansion base and have the advantages of expanding or strengthening the application function of the portable electronic device. The portable electronic device is accommodated inside the expansion base. The touch window of the expansion base exposes a portion of the touch screen of the portable electronic device, and the display image of the touch screen can be automatically adjusted to match the touch window. In this way, the portable electronic device becomes a control core of the expansion base, and a user inputs commands into the portable electronic device via the touch screen to operate the expansion device.

In order to make the features and advantages of the disclosure comprehensible, embodiments accompanied with drawings are described in detail below.

DESCRIPTION OF THE EMBODIMENTS

Figure 1:
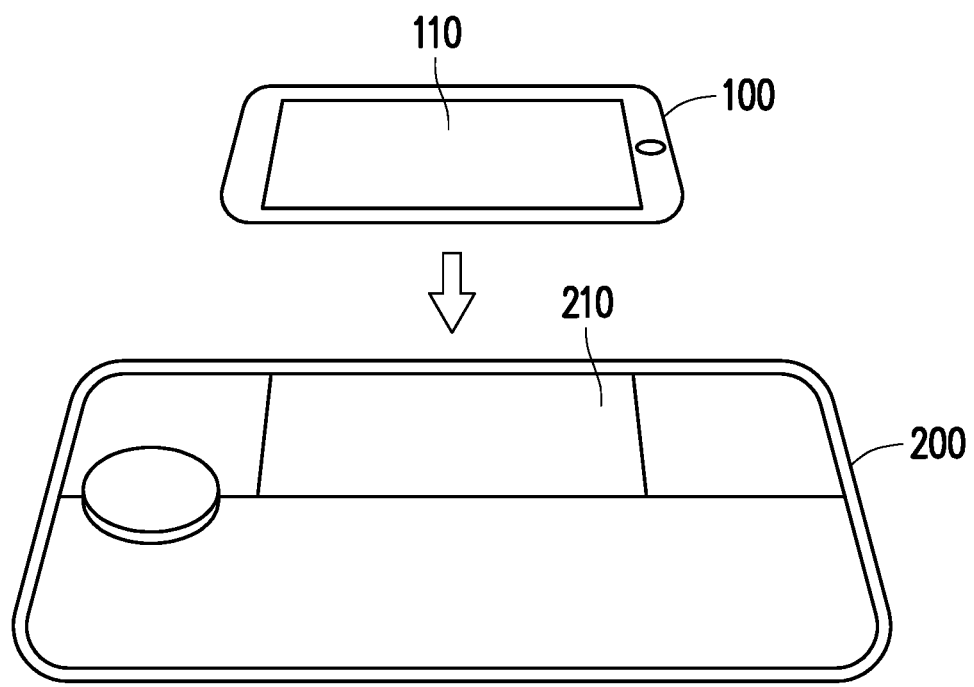
FIG. 1 is a schematic diagram of a combination of an expansion base and a portable electronic device according to an embodiment of the disclosure.
Figure 2:
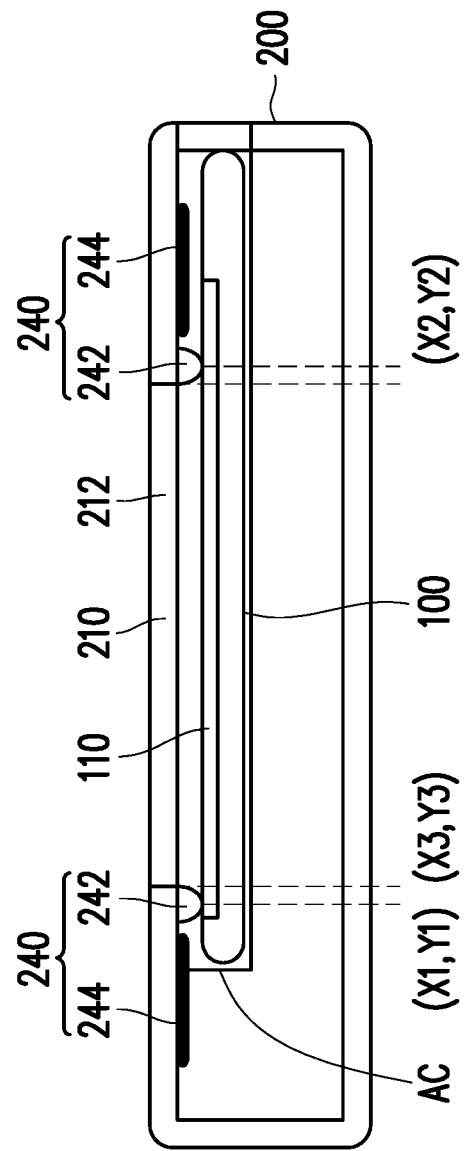
FIG. 2 is a schematic diagram of a side perspective view of the combination of the expansion base with the portable electronic device according to FIG. 1 of the disclosure.

FIG. 1 is a schematic diagram of a combination of an expansion base and a portable electronic device according to an embodiment of the disclosure. FIG. 2 is a schematic diagram of a side perspective view of the combination of the expansion base with the portable electronic device according to FIG. 1 of the disclosure. With reference to FIG. 1 and FIG. 2, a portable electronic device 100 may be detachably assembled to an expansion base 200. The portable electronic device 100 may be, for example, a mobile phone, a tablet PC, or other portable electronic devices with independent computing and touch display function. The type of the portable electronic device 100 is not limited herein. The portable electronic device 100 is pre-installed with an application program and includes a touch screen 110. The expansion base 200 is electrically connected to the portable electronic device 100 as an expansion assembly of the portable electronic device 100, allows the portable electronic device 100 to expand or strengthen its function via the expansion base 200, and enhances the value of the portable electronic device 100 to a user.

Figure 3:
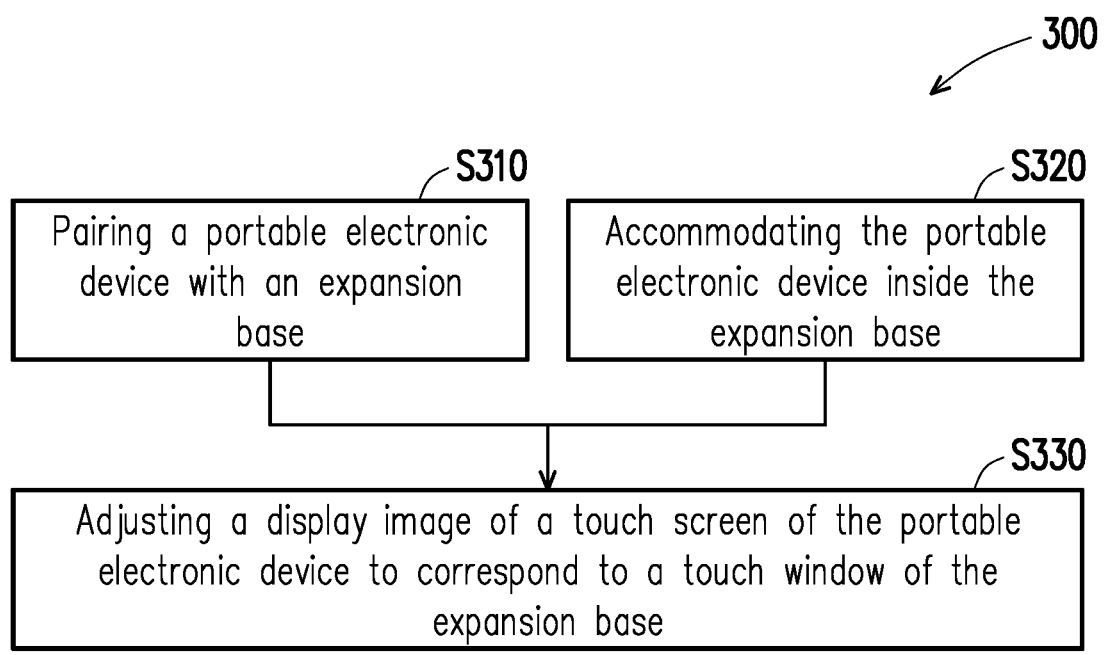
FIG. 3 is a flow chart of an operation method configured to combine the portable electronic device with the expansion base according to an embodiment of the disclosure.

FIG. 3 is a flow chart of an operation method configured to combine the portable electronic device with the expansion base according to an embodiment of the disclosure. The operation method of FIG. 3 is applicable to the portable electronic device 100 and the expansion base 200 of FIG. 1 and FIG. 2. The description of the process of an operation 300 is provided below with reference to the component symbols of FIG. 1 and FIG. 2.

In step S310, pair the portable electronic device 100 with the expansion base 200, wherein the portable electronic device 100 is pre-installed with the application program and has the touch screen 110. In step S320, accommodate the portable electronic device 100 inside the expansion base 200, wherein the surface of the expansion base 200 has a touch window 210 and exposes at least a portion of the touch screen 110. Specifically, the expansion base 200 includes an accommodating chamber AC configured to accommodate the portable electronic device 100. For the expansion base 200, the portable electronic device 100 is an external portable electronic device. Conversely, for the portable electronic device 100, the expansion base 200 is also an external expansion base. However, after the portable electronic device 100 is assembled with the expansion base 200, the portable electronic device 100 is accommodated in the accommodating chamber AC. Therefore, the combined expansion base 200 and the portable electronic device 100 appears to be one from the appearance. The accommodating chamber AC of the expansion base 200 has the touch window 210. When the portable electronic device 100 is placed in the accommodating chamber AC, the touch window 210 exposes at least a portion of the touch screen 110.

It should be noted that an operation method 300 does not limit the sequence of steps S310 and S320. Step S310 or step S320 may be performed first or both at the same time. Next, perform step S330. The portable electronic device 100 executes the application program to automatically adjust a size or a display position of the display image of the touch screen 110 to correspond to the touch window 210.

In short, when the portable electronic device 100 is assembled inside the expansion base 200, the touch window 210 of the expansion base 200 exposes a portion of the touch screen 110. The portable electronic device 100 may automatically adjust the display image of the touch screen 110 to match the size of the touch window 210.

In an embodiment of the disclosure, the touch window 210 includes a protective layer 212, such as glass. The user applies a touch operation to the touch screen 110 through the touch window 210 to use the portable electronic device 100 and the expansion base 200. That is, the user inputs commands into the touch screen 110 to control the portable electronic device 100 and the expansion base 200. In other embodiments, the touch window 210 may also be an opening that allows the user to touch the touch screen 110 directly.

The implementation details of the operation method 300 are further described below.

Figure 4:
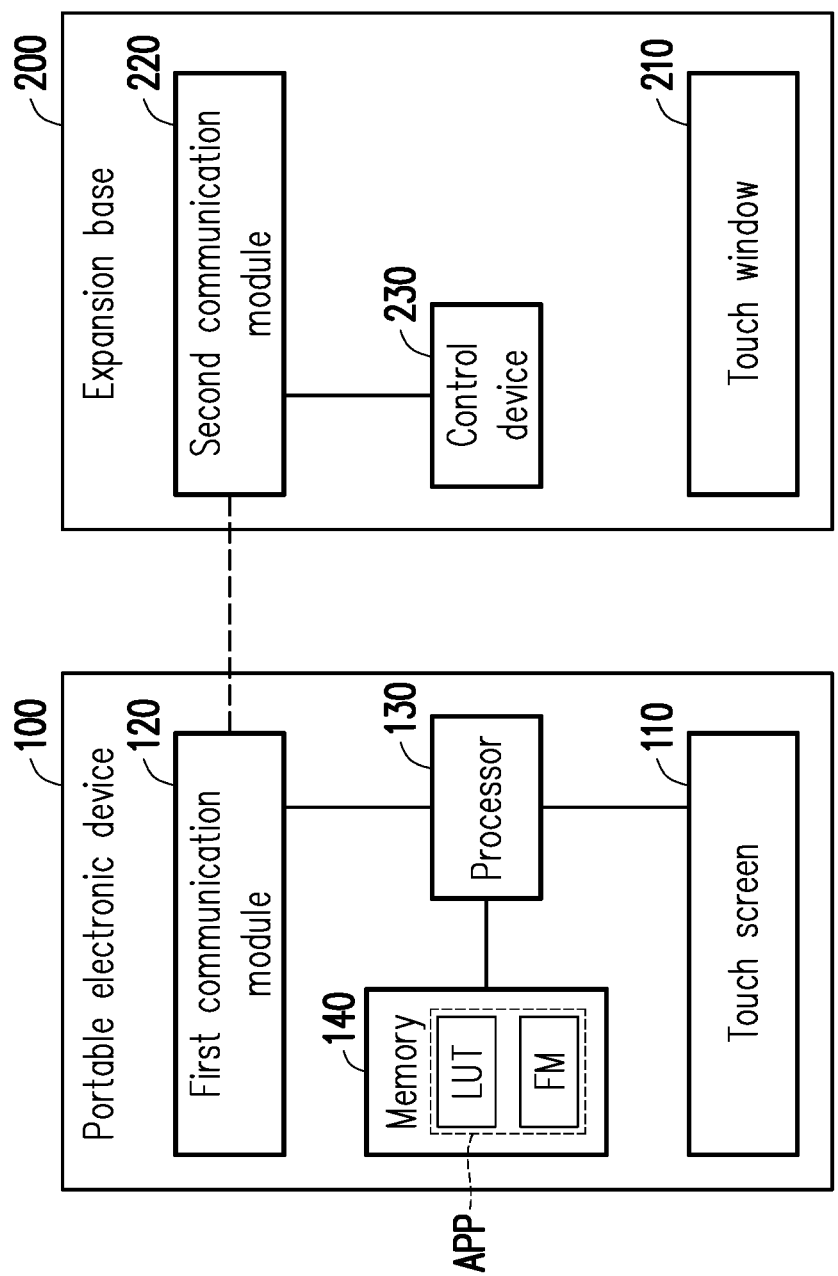
FIG. 4 is a block schematic diagram of a circuit structure of the expansion base and the portable electronic device according to FIG. 1 of the disclosure.

FIG. 4 is a block schematic diagram of a circuit structure of the expansion base and the portable electronic device according to FIG. 1 of the disclosure. Please continue to refer to FIG. 4, the portable electronic device 100 includes the touch screen 110, a first communication module 120, a processor 130, and a memory 140. The processor 130 is electrically connected to the touch screen 110, the first communication module 120 and the memory 140. The expansion base 200 includes a second communication module 220 and a control device 230. The control device 230 is electrically connected to the second communication module 220 to receive control commands from the processor 130.

The first communication module 120 and the second communication module 220 may connect the portable electronic device 100 and the expansion base 200 via wireless communication or wired communication. The first communication module 120 and the second communication module 220 include, for example, a Thunderbolt interface, a Universal Serial Bus (USB), or support Bluetooth, WiFi, Worldwide Interoperability for Microwave Access (WiMax), Near Field Communication (NFC), Long Term Evolution (LTE) and wireless communication modules of various wireless communication standards, and are not particularly limited by the disclosure.

The processor 130 is, for example, a central processing unit (CPU) or other hardware devices with computing capability. The control device 230 is, for example, a microprocessor or a microcontroller (MCU). The disclosure is not limited thereto.

The memory 140 is a storage medium configured to store an application program APP and other data, program codes, images, and the like that may be used in an operation of the portable electronic device 100. The application program APP is loaded by the portable electronic device 100 to execute the operation method 300. The memory 140 is, for example, any type of fixed or movable random access memory (RAM), read-only memory (ROM), flash memory, hard drive or other similar devices, integrated circuits and combinations thereof. The disclosure is not limited thereto.

The portable electronic device 100 and the expansion base 200 are paired through the first communication module 120 and the second communication module 220. The portable electronic device 100 may automatically adjust the display image of the touch screen 110 according to the pairing information of the expansion base 200 for corresponding to the touch window 210. The pairing information includes, for example, an identifier, a specification, or a model of the expansion base 200. The expansion base 200 transmits the identifier of the expansion base 200 to the portable electronic device 100 via the second communication module 220. The application program APP stored in the memory 140 includes a look-up table LUT, wherein the look-up table LUT records information of the identifiers of the various expansion bases 200 and its touch window 210, such as the size or shape of the touch window 210. After the portable electronic device 100 is paired with the expansion base 200, the processor 130 of the portable electronic device 100 searches for the information of the touch window 210 from the look-up table LUT of the application program APP according to the identifier of the expansion base 200 and adjusts the display image to match the touch window 210.

The application program APP also includes multiple function modules, such as a function module FM1, a function module FM2, a function module FM3 and the like, and are collectively displayed as a function module FM in FIG. 4. The processor 130 also executes a corresponding function module FM according to the identifier of the expansion base 200 and displays the corresponding user interface in the display image. In an embodiment, each type of the expansion base 200 has the corresponding function module FM, and each of the function modules FM may have its own user interface. The user applies the touch operation to the user interface through the touch window 210. It should be particularly explained that since the display image is adjusted to match the size or shape of the touch window 210, the user interface naturally matches the size or shape of the touch window 210. In some embodiments, the user may also use these function modules FM via a unified user interface or an original interface of the portable electronic device 100 which are not particularly limited by the disclosure.

The user applies the touch operation to the adjusted touch screen 110 through the touch window 210. The processor 130 generates a control signal according to the touch operation by the user. The control device 230 of the expansion base 200 receives the control signal from the portable electronic device 100 to operate the expansion base 200 to respond to the user's touch operation. Therefore, the user may operate the portable electronic device 100 and the expansion base 200 by using the touch screen 110.

For example, when the expansion base 200 is a speaker device, the processor 130 recognizes that the expansion base 200 is a speaker device according to the identifier of the expansion base 200 and executes the function module FM1 having a music playing function. Then, the touch screen 110 displays a music playing interface within the scope of the touch window 210. The user taps a play button to play music via the expansion base 200.

In another embodiment, when the expansion base 200 is a projector device, the processor 130 executes the function module FM2 having a projection function. The user may see the complete operation interface in the touch window 210 and operate the portable electronic device 100 and the expansion base 200 to project an image.

In another embodiment, when the expansion base 200 is a clock, the processor 130 executes the function module FM3 having a display function. The user may see the time displayed by the portable electronic device 100 in the touch window 210 and may also set the alarm via the touch screen 110. Or, when the expansion base 200 is a digital photo frame, the processor 130 executes the function module FM3 having a display function. The user sees the photo displayed by the portable electronic device 100 in the touch window 210.

Next, how the portable electronic device 100 corresponds to the touch window 210 to adjust the display image is described in detail below.

Figure 5:
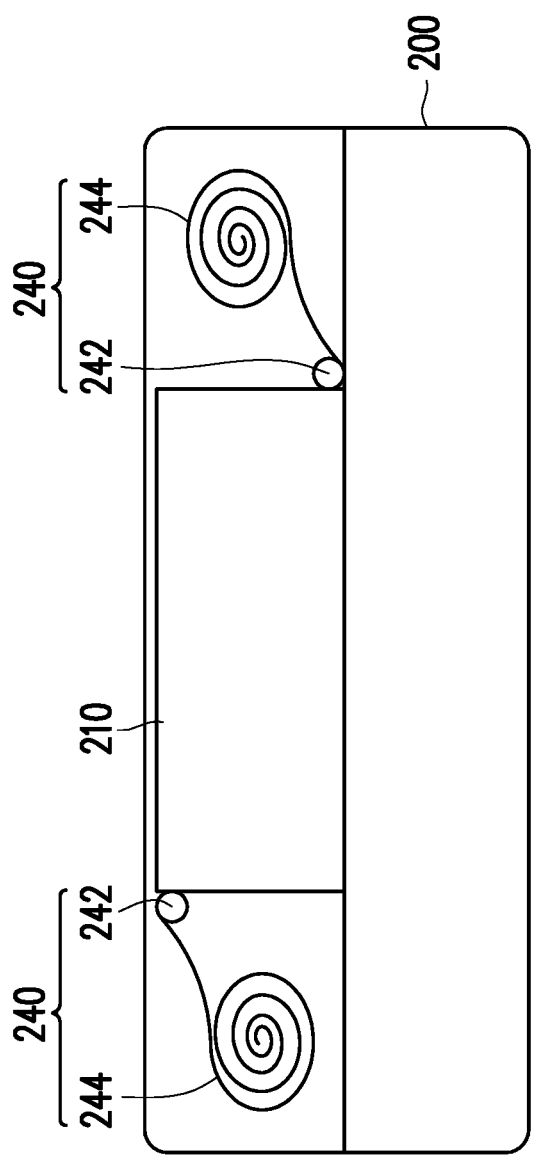
FIG. 5 is a schematic diagram of a top perspective view of the expansion base according to FIG. 1 of the disclosure.

FIG. 5 is a schematic diagram of a top perspective view of the expansion base according to FIG. 1 of the disclosure. With reference to FIG. 5 together with FIG. 2, the expansion base 200 further includes at least one touch detection component 240 disposed at a corner edge of the touch window 210. The disclosure does not limit the number of the touch detection components 240. In FIG. 5, the expansion base 200 includes two touch detection components 240 respectively disposed at diagonal positions of the touch window 210. One touch detection component 240 is located at the very edge of the upper left corner of the touch window 210 and the other touch detection component 240 is located at the very edge of the lower right corner of the touch window 210. When the portable electronic device 100 is accommodated in the accommodating chamber AC, the touch detection components 240 touch the touch screen 110 to generate a positioning touch signal. The processor 130 determines the size or the display position of the display image of the touch screen 110 according to the positioning touch signal.

What should be noted is that, in an embodiment of the disclosure, the processor 130 may distinguish the positioning touch signal generated by the touch detection component 240 from the touch signal caused by the touch operation of the user described above. For example, the position of the touch detection component 240 is fixed, so the touch position of the positioning touch signal is also fixed. Or, a touch time lasts and exceeds a threshold time. Or the touch detection component 240 is located on the outside of the touch window 210, and the touch operation input by the user is within the touch window 210.

In an embodiment of the disclosure, each touch detection component 240 includes a bump-like touch object 242 and a wire 224. The bump-like touch object 242 is a conductor and is coupled to the wire 244, wherein the length of the wire 244 is greater than or equal to 20 centimeters. The bump-like touch object 242 touches the touch screen 110 to generate the positioning touch signal. In some embodiments, the bump-like touch object 242 may be externally wrapped with a protective film such as a conductive fiber cloth or rubber to prevent scratches on the touch screen 110.

Figure 6:
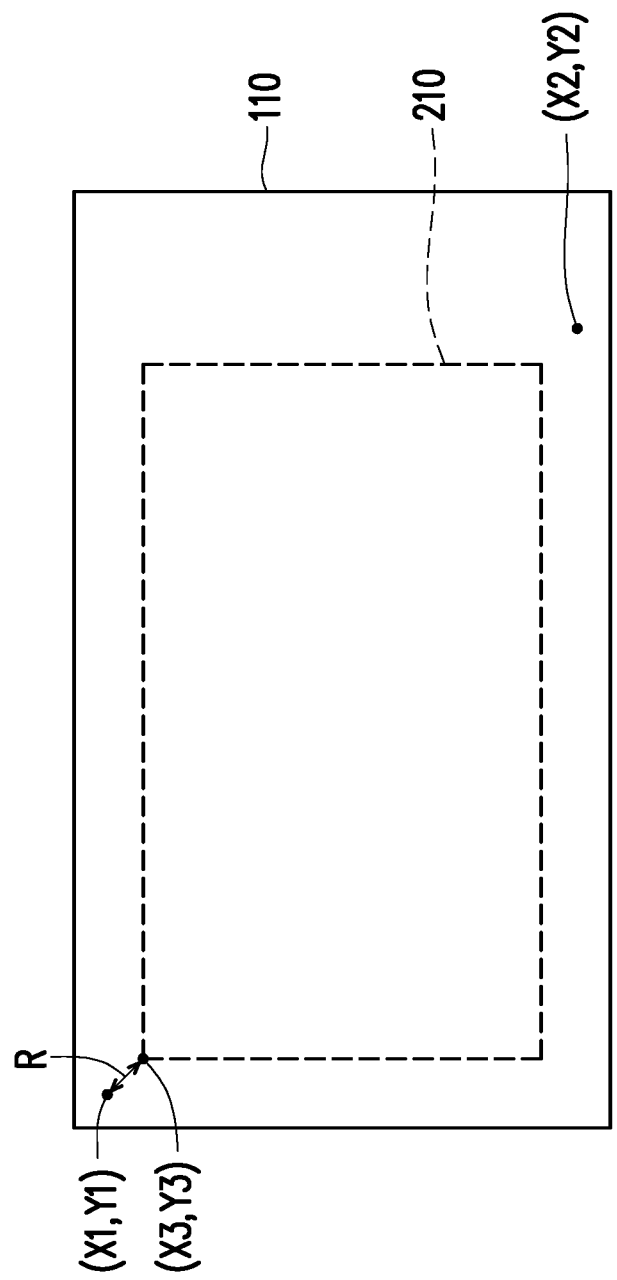
FIG. 6 is a schematic diagram of a touch screen and a touch window according to FIG. 2 of the disclosure.
Figure 7:
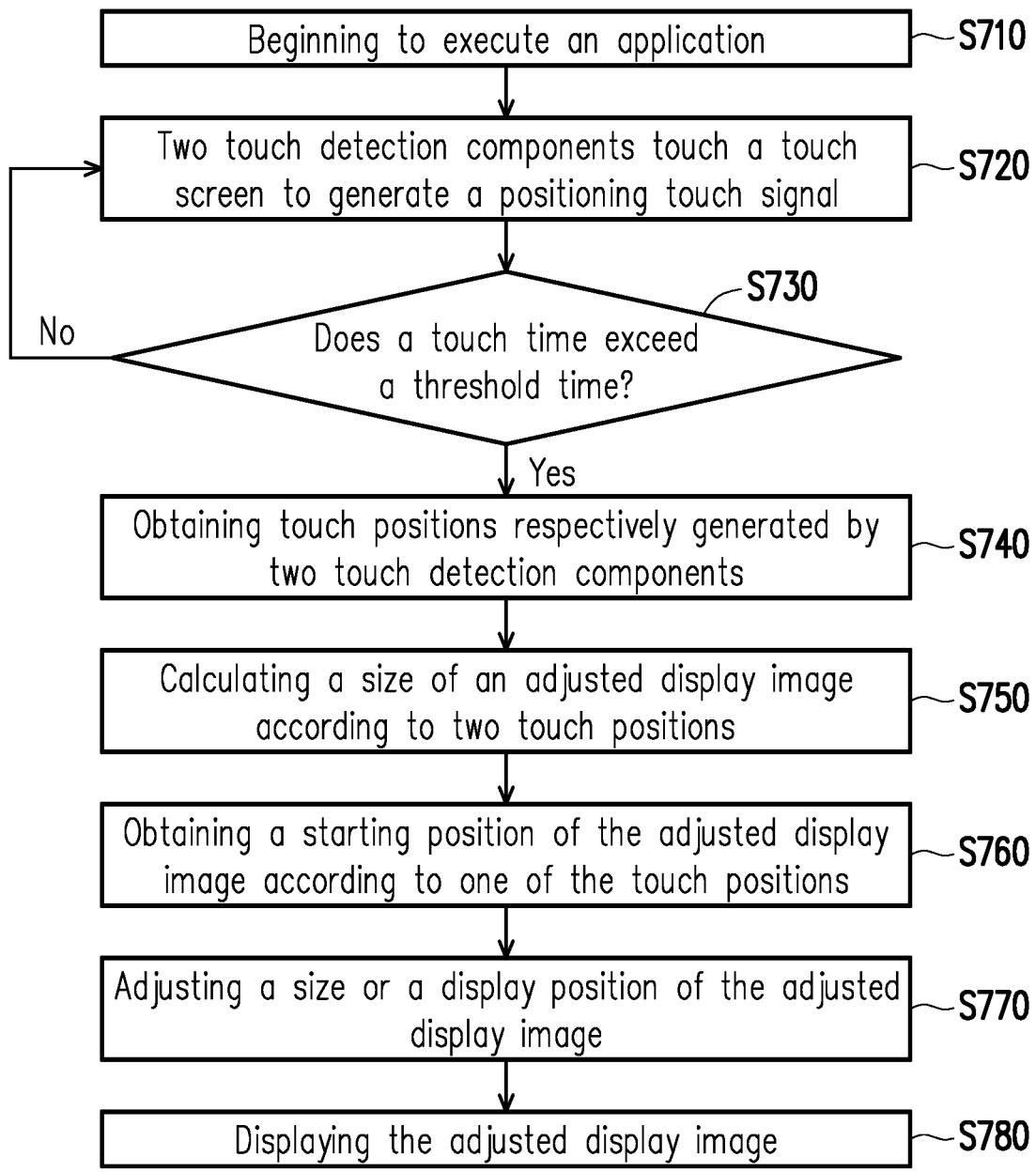
FIG. 7 is a flow chart of adjusting a size of a display image by the portable electronic device according to an embodiment of the disclosure.

FIG. 6 is a schematic diagram of the touch screen and the touch window according to FIG. 2 of the disclosure. FIG. 7 is a flow chart of adjusting of the size of the display image by the portable electronic device according to an embodiment of the disclosure. With reference to FIG. 6 and FIG. 7 together with FIG. 2 and FIG. 4, the portable electronic device 100 determines the display position of the display image according to the positioning touch signal and the size or the position of the touch detection component 240. In step S710, the application program APP is loaded and executed by the portable electronic device 100. In step S720, the portable electronic device 100 is placed in the accommodating chamber AC of the expansion base 200 and the two touch detection components 240 respectively located at the upper left and the lower right position touch the touch screen 110 to generate the positioning touch signal. In step S730, the processor 130 determines whether the touch time exceeds the threshold time, for example, 2 seconds, according to the positioning touch signal. If the touch time exceeds the threshold time, the process proceeds to step S740, and the size or the display position of the display image is adjusted correspondingly. Otherwise, the process returns back to step S720. In step S740, the processor 130 obtains the touch positions (X1, Y1) and (X2, Y2) where the touch screen 110 is touched by the two touch detection components 240 according to the positioning touch signal. In step S750, the processor 130 calculates the size of the adjusted display image according to the two touch positions (X1, Y1) and (X2, Y2). For example, the length is |Y2−Y1| and the width is |X2−X1|.

In addition, the touch position of the bump-like touch object 242 and the corner position of the touch window 210 actually have an offset amount R. The offset amount R may be caused by the size of the bump-like touch object 242 (for example, when the bump-like touch object 242 is a circular bump, the offset amount R is the radius of the occupied area) or is an error between the position of the touch detection component 240 and the corner of the touch window 210. The offset amount R may also be recorded in the look-up table LUT as part of the information of the touch window 210. The processor 130 may obtain the information of the touch window 210 from the look-up table LUT according to the identifier of the expansion base 200, such as the size, shape or the offset amount R between the bump-like touch object 242 and the touch window 210, etc. In FIG. 5, the touch window 210 is a rectangular area, as indicated by a broken line.

Next, in step S760, the processor 130 obtains the starting position of the adjusted display image according to at least one of the two touch positions (X1, Y1) and (X2, Y2). For example, shift the position of the touch position (X1, Y1) by the offset amount R to obtain the starting position (X3, Y3) of the display image, where X3=X+R and Y3=Y1+R.

In step S770, the processor 130 adjusts the display image according to the size and the starting position (X3, Y3) of the adjusted display image calculated above. In step S780, the processor 130 displays the adjusted display image on the touch screen 110. Its size and display position just match the touch window 210. In addition, the disclosure does not limit the shape of the touch window 210 to be a rectangle. It may be a circle or other shapes. When the touch window 210 is of other shapes, a length |Y2−Y1| and a width |X2−X1| may indicate the maximum length of the touch window 210 in the Y direction and the maximum width in the X direction.

Figure 8:
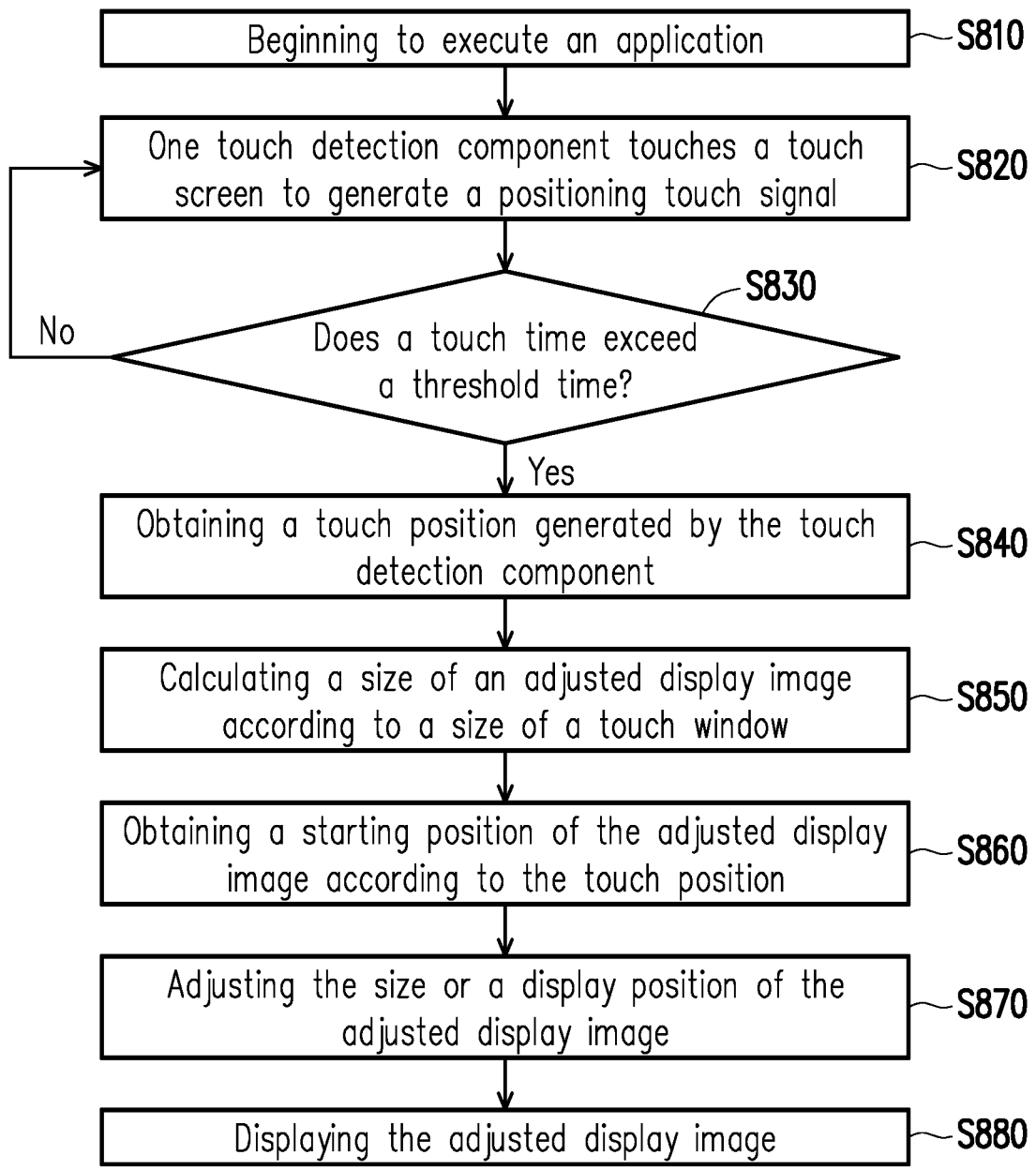
FIG. 8 is a flow chart of adjusting the size of the display image by the portable electronic device according to another embodiment of the disclosure.

FIG. 8 is a flow chart of adjusting of the size of the display image by the portable electronic device according to another embodiment of the disclosure. In an embodiment of FIG. 8, the expansion base 200 may only set with one touch detection component 240. For example, only the touch detection component 240 in the upper left of FIG. 5 is needed. In step S810, the application program APP is loaded and executed by the portable electronic device 100. In step S820, the portable electronic device 100 is placed in the accommodating chamber AC of the expansion base 200 and the touch screen 110 is touched by one touch detection component 240 to generate the positioning touch signal. In step S830, the processor 130 determines whether the touch time exceeds the threshold time, for example, 2 seconds, according to the positioning touch signal. If the touch time exceeds the threshold time, the process proceeds to step S840. Otherwise, the returns back to step S820.

In step S840, the processor 130 obtains the touch position (X1, Y1) of the touch detection component 240 according to the positioning touch signal, and obtains the information of the touch window 210 from the look-up table LUT. In step S850, the processor 130 may calculate the length and width of the adjusted display image on the touch screen 110 via a density-independent pixel (DP) and a dot per inch (DPI) conversion according to the size of the touch window 210. In step S860, the processor 130 obtains the starting position (X3, Y3) of the display image according to the touch position (X1, Y1) and the offset mount R, wherein X3=X+R and Y3=Y1+R. What should be noted is that the density-independent pixels and the resolution of the mobile phone are also stored in the memory 140 in advance. In step S870, the processor 130 adjusts the size or the display position of the display image according to the size and the starting position (X3, Y3) of the adjusted display image calculated above. In step S880, the processor 130 displays the adjusted display image on the touch screen 110, wherein it happens to match the touch window 210.

Figure 9A:
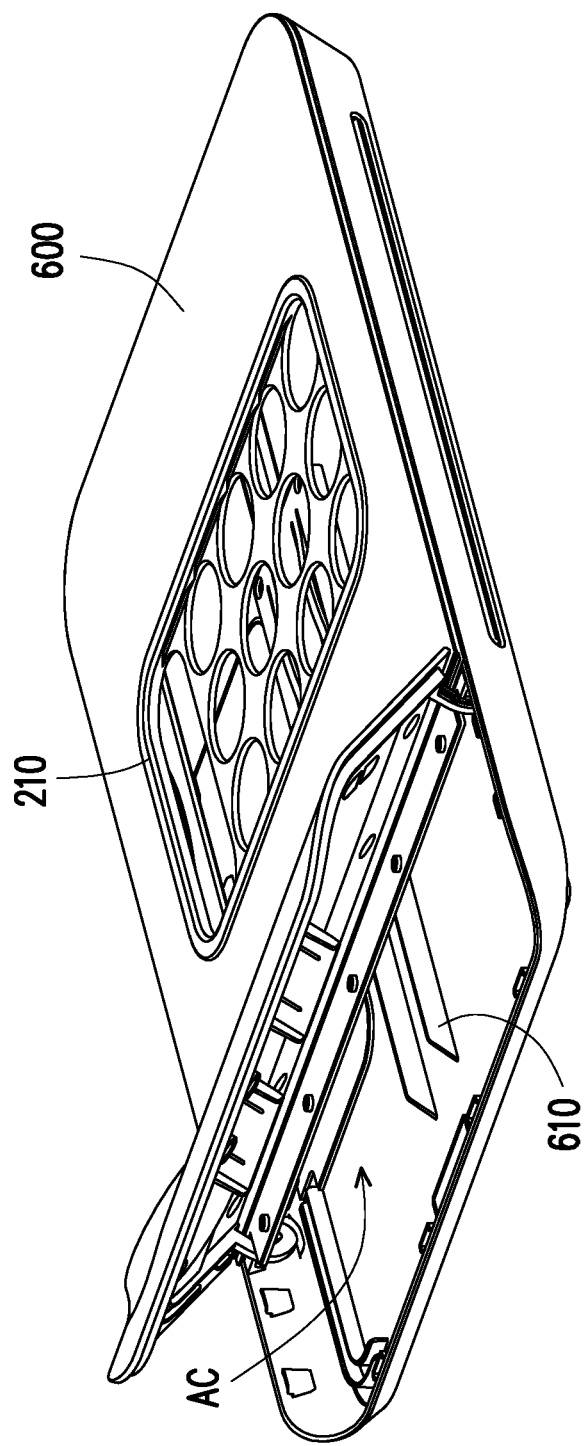
FIG. 9A through FIG. 9C are schematic diagrams of a process of combining the portable electronic device and the expansion base according to another embodiment of the disclosure.
Figure 9B:
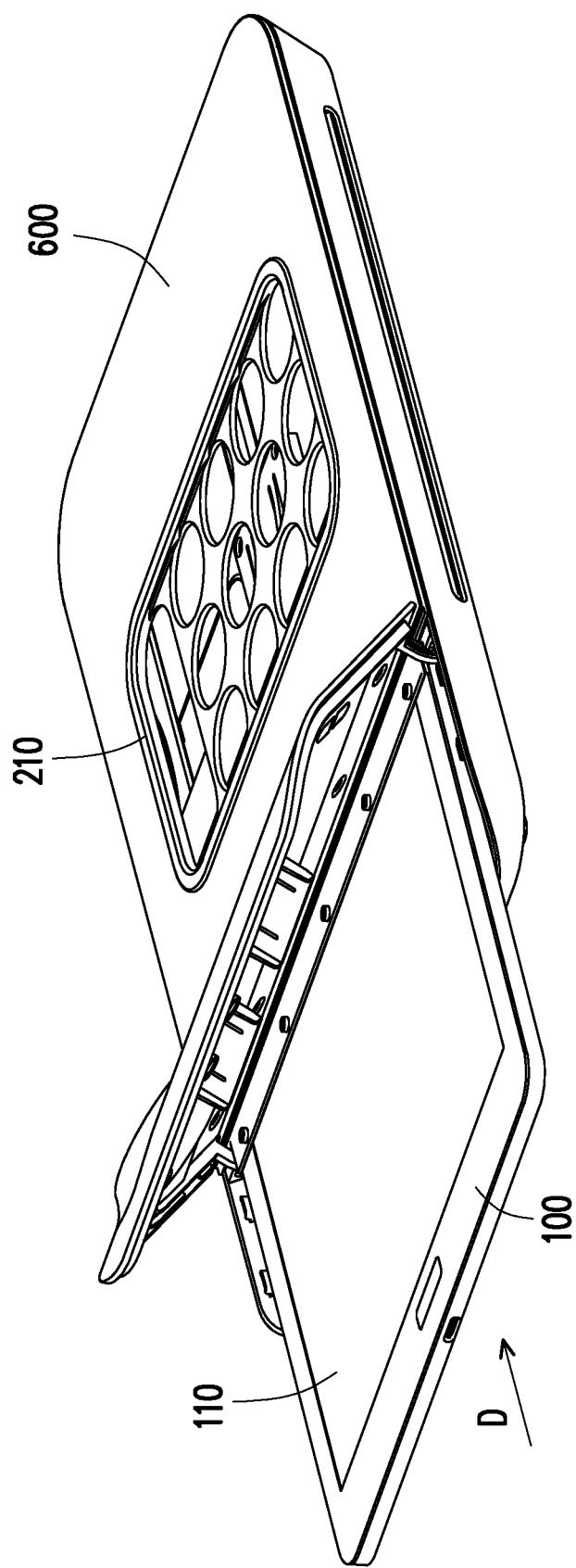
Figure 9C:
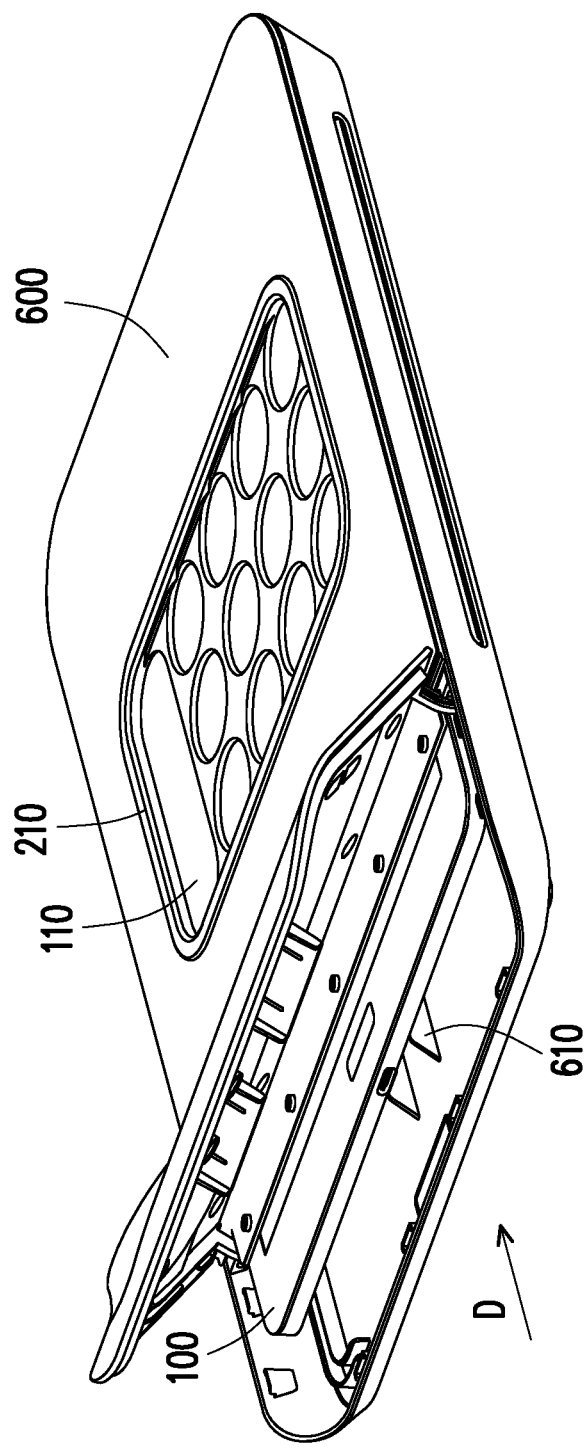

FIG. 9A through FIG. 9C are schematic diagrams of a process of combining the portable electronic device and the expansion base according to another embodiment of the disclosure. With reference to FIG. 9A through FIG. 9C, the combination of the portable electronic device 100 and an expansion base 600 and the remaining implementation details are similar to that of the portable electronic device 100 and the expansion base 200 of FIG. 1. From FIG. 9A through FIG. 9C, the expansion base 600 is a telephone expansion device. The portable electronic device 100 may be placed in the accommodating chamber AC of the expansion base 600 along the sliding groove 610 in a sliding direction D.

Figure 10:
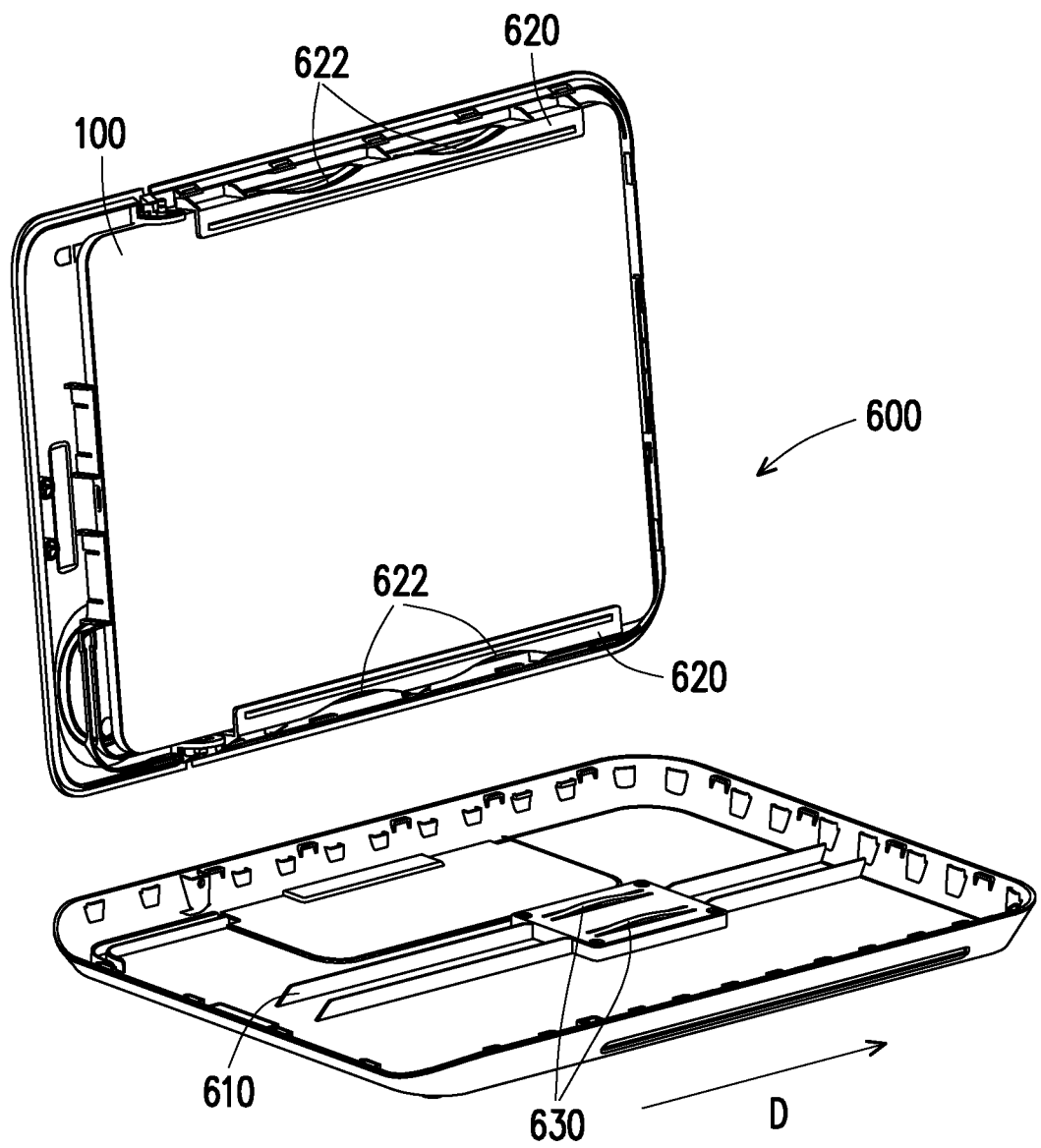
FIG. 10 is a structural disassembly diagram of the expansion base according to FIG. 9A through FIG. 9C of the disclosure.

FIG. 10 is a structural disassembly diagram of the expansion base according to FIG. 9A through FIG. 9C of the disclosure. In FIG. 10, the expansion base 600 further includes a sliding rail device 620 disposed in the accommodating chamber AC. The sliding rail device 620 extends in the sliding direction D. The portable electronic device 100 is coupled to the sliding rail device 620 to be slidably disposed in the accommodating chamber AC.

The expansion base 600 also includes an elastic engaging structure. The elastic engaging structure is configured to adapt to multiple sizes of the portable electronic device 100 to fix the portable electronic device 100 in the accommodating chamber AC. In an embodiment of the disclosure, the elastic engaging structure includes four spring pieces 622 and a spring piece 630 in FIG. 10. The portable electronic device 100 is fixed by the elasticity of the spring pieces 622 and the spring piece 630. Four spring pieces 622 are disposed on the sliding rail device 620 on the left and right side of the accommodating chamber AC and the spring piece 630 is disposed on the sliding groove 610. However, the disclosure does not limit the number and the setting position of the spring pieces. When the portable electronic device 100 is slidably disposed along the sliding rail device 620 and the sliding groove 610 in the accommodating chamber AC, the portable electronic device 100 squeezes the spring pieces 622 and the spring piece 630. The elasticity given by the spring pieces 622 may fix the left and right side of the portable electronic device 100 and the elasticity of the spring piece 630 may prevent the portable electronic device 100 from shaking up and down.

What should be particularly noted is that since the elastic engaging structure has a telescopic space, the accommodating chamber AC of the expansion base 600 is not limited to accommodate only one single size of the portable electronic device 100. It may accommodate different sizes of the portable electronic devices 100. In this way, the expansion base 600 may be combined with various specifications and sizes of the portable electronic devices 100 via a simple structure to increase its application space significantly.

Figure 11:
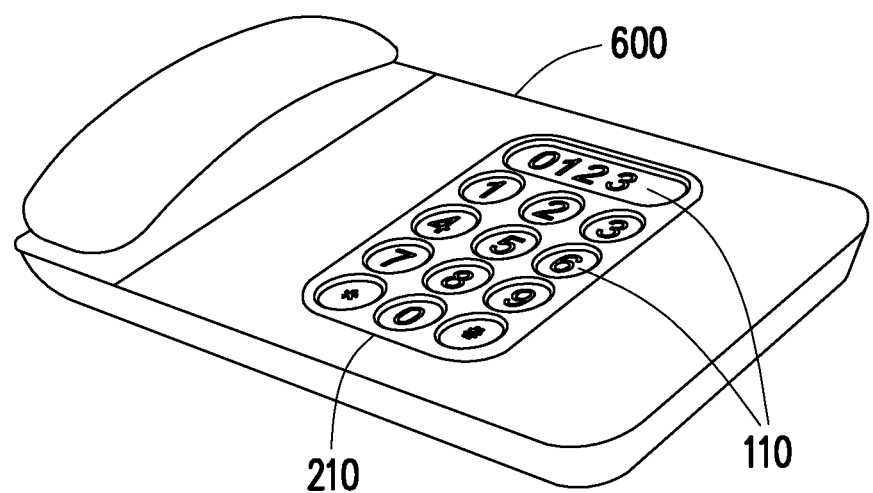
FIG. 11 is a schematic diagram of the completion of the combination of the portable electronic device and the expansion base according to FIG. 9A through FIG. 9C of the disclosure.

FIG. 11 is a schematic diagram of the completion of the combination of the portable electronic device and the expansion base according to FIG. 9A through FIG. 9C of the disclosure. When the portable electronic device 100 is assembled with the expansion base 600, the touch window 210 of the expansion base 600 exposes a portion of the touch screen 110 of the portable electronic device 100. To correspond to the touch window 210, the portable electronic device 100 adjusts the display image and displays the corresponding display interface. In FIG. 8, the touch screen 110 displays corresponding phone dial keys at each of the openings of the touch window 210 so that the user may touch these phone dial keys to make a call.

In summary of the above, the storage medium, the expansion base and the operation method thereof combined with the portable electronic device of the disclosure may combine the expansion base with the portable electronic device and improve the usable value of the portable electronic device. The expansion base of the disclosure has the advantage of a simple structure and may be combined with portable electronic devices of different specifications or sizes. Also, the application program of the portable electronic device automatically adjusts the display image to match the touch window of the expansion base so that the expansion base has high compatibility.

Although the disclosure has been described with reference to the above embodiments, it will be apparent to the person of ordinary skill in the art that modifications to the described embodiments may be made without departing from the spirit and the scope of the disclosure. Accordingly, the scope of the disclosure will be defined by the attached claims and their equivalents and not by the above-detailed descriptions.

What is claimed is:

1. An operation method configured to combine a portable electronic device with an expansion base comprising:
   pairing the portable electronic device with the expansion base, wherein the portable electronic device is pre-installed with an application program and comprises a touch screen;
   accommodating the portable electronic device inside an accommodating chamber of the expansion base, wherein the surface of the expansion base has a touch window to expose at least a portion of the touch screen; and
   executing the application program to automatically adjust a size or a display position of a display image of the touch screen to match a size of the touch window;
   wherein the expansion base comprising:
   at least one touch detection component, disposed at a corner edge of the touch window, wherein the at least one touch detection component touches the touch screen to allow the portable electronic device to generate a positioning touch signal when the portable electronic device is accommodated inside the accommodating chamber,
   wherein the at least one touch detection component comprises a bump-like touch object and a wire and the bump-like touch object is coupled to the wire.

2. The operation method according to claim 1, wherein the step of pairing the portable electronic device with the expansion base comprises:
   searching for information of the touch window from a look-up table of the application program according to an identifier of the expansion base and adjusting the display image to match the touch window.

3. The operation method according to claim 2, wherein the step of executing the application program to automatically adjust the size or the display position of the display image to correspond to the touch window comprises:
   executing a corresponding function module according to the identifier and displaying a corresponding user interface in the display image.

4. The operation method according to claim 1, further comprising:
   applying a touch operation to the touch screen by a user through the touch window; and
   receiving a control signal from the portable electronic device via a control device of the expansion base to operate the expansion base to respond to the touch operation.

5. The operation method according to claim 1, wherein the step of executing the application program to automatically adjust the size or the display position of the display image to correspond to the touch window comprises:
   touching the touch screen to generate a positioning touch signal via at least one touch detection component disposed at a corner edge of the touch window and determining the size or the display position of the display image according to the positioning touch signal when the portable electronic device is accommodated inside the expansion base.

6. The operation method according to claim 5, wherein the step of executing the application program to automatically adjust the size or the display position of the display image to correspond to the touch window further comprises:
   determining the display position of the display image according to the positioning touch signal and a size or a position of e at least one touch detection component.

7. The operation method according to claim 5, wherein the step of executing the application program to automatically adjust the size or the display position of the display image to correspond to the touch window further comprises:
   determining whether a touch time exceeds a time threshold according to the positioning touch signal and correspondingly adjusting the size or the display position of the display image.

8. A non-transitory storage medium configured to store an application program, wherein the application program is loaded by a portable electronic device to perform:
   pairing the portable electronic device with an external expansion base;
   accommodating the portable electronic device inside an accommodating chamber of the external expansion base, wherein the surface of the external expansion base has a touch window to expose at least a portion of a touch screen of the portable electronic device; and
   adjusting automatically a size or a display position of a display image of the touch screen according to pairing information of the external expansion base to match a size of the touch window,
   wherein the external expansion base comprising:
   at least one touch detection component, disposed at a corner edge of the touch window, wherein the at least one touch detection component touches the touch screen to allow the portable electronic device to generate a positioning touch signal when the portable electronic device is accommodated inside the accommodating chamber,
   wherein the at least one touch detection component comprises a bump-like touch object and a wire and the bump-like touch object is coupled to the wire.

9. The non-transitory storage medium according to claim 8, wherein the application program is loaded by the portable electronic device to perform:

searching for information of the touch window from a look-up table of the application program according to an identifier of the external expansion base and adjusting the display image to match the touch window.

10. The non-transitory storage medium according to claim 9, wherein the application program is loaded by the portable electronic device to perform:
executing a corresponding function module according to the identifier to display a corresponding user interface in the display image.

11. The non-transitory storage medium according to claim 8, wherein the application program is loaded by the portable electronic device to perform:
generating a control signal according to a touch operation applied by a user to the adjusted touch screen; and
sending the control signal to a control device of the external expansion base to operate the external expansion base to correspond to the touch operation.

12. The non-transitory storage medium according to claim 8, wherein the application program is loaded by the portable electronic device to perform:
touching the touch screen to generate a positioning touch signal via at least one touch detection component disposed at a corner edge of the touch window and determining the size or the display position of the display image according to the positioning touch signal when the portable electronic device is accommodated inside the external expansion base.

13. The non-transitory storage medium according to claim 12, wherein the application program is loaded by the portable electronic device to perform:
determining the size or the display position of the display image according to the positioning touch signal and a size or a position of the at least one touch detection component.

14. The non-transitory storage medium according to claim 12, wherein the application program is loaded by the portable electronic device to perform:
determining whether a touch time exceeds a time threshold according to the positioning touch signal and correspondingly adjusting the size or the display position of the display image.

15. An expansion base adapted for accommodating an external portable electronic device, comprising:
an accommodating chamber, configured to accommodate the external portable electronic device and having a touch window, wherein the touch window exposes at least a portion of a touch screen of the external portable electronic device when the external portable electronic device is placed in the accommodating chamber; and
a second communication module, configured to pair with a first communication module of the external portable electronic device and transmitting an identifier of the expansion base to the external portable electronic device to allow the external portable electronic device to automatically adjust a size or a display position of a display image of the touch screen according to the identifier to match a size of the touch window,
wherein the expansion base comprising:
at least one touch detection component, disposed at a corner edge of the touch window, wherein the at least one touch detection component touches the touch screen to allow the external portable electronic device to generate a positioning touch signal when the external portable electronic device is accommodated inside the accommodating chamber,
wherein the at least one touch detection component comprises a bump-like touch object and a wire and the bump-like touch object is coupled to the wire.

16. The expansion base according to claim 15, further comprising:
a control device, configured to receive a control signal from the external portable electronic device to operate the expansion base to respond to a touch operation on the adjusted touch screen by a user through the touch window.

17. The expansion base according to claim 15, wherein the at least one touch detection component comprises two touch detection components respectively disposed at the diagonal positions of the touch window.

18. The expansion base according to claim 15, further comprising:
an elastic engaging structure, configured to adapt a plurality of sizes of external portable electronic devices to fix the external portable electronic device in the accommodating chamber.

19. The expansion base according to claim 18, further comprising:
a sliding rail device, extending in a sliding direction and disposed in the accommodating chamber, wherein the external portable electronic device is coupled to the sliding rail device to slidably disposed in the accommodating chamber and the elastic engaging structure is disposed on the sliding rail device.

20. The expansion base according to claim 18, wherein the elastic engaging structure comprising at least one spring piece and the external portable electronic device is fixed by the elasticity of the at least one spring piece.

* * * * *